3,436,237
COKE BONDED BASIC REFRACTORY
James A. Crookston and William R. Gritton, Mexico, Mo., assignors, by mesne assignments, to A. P. Green Refractories Co., Mexico, Mo., a corporation of Missouri
No Drawing. Filed Oct. 25, 1966, Ser. No. 589,228
Int. Cl. C04b 35/02, 35/06
U.S. Cl. 106—58        2 Claims

---

ABSTRACT OF THE DISCLOSURE

A coke bonded refractory product having tar impregnated into interstices of the matrix, the product having a density of 180–192 lbs./ft.$^3$, a modulus of rupture of 2000–4000 p.s.i., substantially no apparent porosity and a residual carbon value of 4%–7%.

---

This invention relates to a coke bonded refractory having a high residual carbon content and particularly relates to a coke bonded tar impregnated refractory and to a process of making same.

The oxygen converter process, also known as the LD process, Kaldo process, or oxygen steelmaking process, is a relatively recent development in the production of steel. It permits the rapid production of steel by use of gaseous oxygen which is blown onto the surface of metal inside the converters, thus greatly accelerating the steelmaking reactions.

Since basic slags are used in the processing, basic refractories are required for lining the vessels. These basic refractories are comprised of aggregates of dead-burned magnesite, dead-burned dolomite, dead-burned lime, or combinations of them, bonded with tar or pitch. The tar or pitch binder in such refractories imparts, first, the green strength and, later, under service conditions of high temperature, a carbon bond, which is developed due to the coking of the tar or pitch originally added to provide green strength. High residual carbon content in these products is desirable to resist wetting and erosion by slag and metal. The residual carbon is a measure of the coked carbonaceous matter which remains in the product after heat treatment has removed the low temperature volaties and hydrogen content from the original pitch, thus leaving only carbon in the form of coke. Since, after exposure to high temperatures, the coked pitch affords the principal bonding medium in the refractories, and since the coked pitch residuum appears to offer the necessary resistance to slag erosion in the converter environment, the higher the residual carbon value can be made, the better is the resistance of these brick to slag in service. Improved physical properties, such as strength and resistance to thermal shock are quite important in providing a refractory which will give superior behavior in service, and a coked bond helps provide such improved physical properties.

The tar or pitch binder also gives protection from hydration in refractories containing dead-burned dolomite.

It is the principal object of this invention to provide a coke bonded brick product, and a method for producing it, which is characterized by an appreciably higher residual carbon value compared to the usual refractories bonded with tar or pitch. The tar or pitch materials may be derivations of either coal or petroleum products.

It is a further object of this invention to provide a tar impregnated basic refractory product, and method of producing it, which also possesses a carbon bond prior to its exposure to service conditions and which has improved physical properties.

Several methods have been proposed to increase the number value of residual carbon results. However, these methods do not enhance the physical properties, particularly strength. Such methods include the simple addition of very high softening point granulated pitches to the refractory aggregates, after which the composite materials are mixed with a lower softening point pitch in a liquid form and then formed under high pressure into conventional brick product shapes. Another such method involves the addition of graphite or carbon black materials in place of granulated high softening point pitches, and processing as described. It will be recognized that in neither of these methods is the intent to improve physical properties.

It is also been proposed to add pitch to a conventional fired brick product. This pitch is placed into the pores of the brick by soaking in hot pitch either at atmospheric or elevated pressures. Such procedures do not result in high residual carbon, however.

The present invention comprises a refractory of increased residual carbon value and improved physical properties. In this invention, refractory aggregates, comprised of dead-burned magnesite, dead-burned dolomite, dead-burned lime, or mixtures of them, are mixed with a heated pitch binder and formed under high pressures into conventional tar-bonded refractory shapes. The compositions of the refractory aggregates are not a limitation on the methods of this invention, although it is realized that grain chemistry of the refractory aggregate can influence, under certain conditions, the residual carbon values. For instance $Fe_2O_3$ can be reduced by carbon with a resultant liberation of carbon monoxide and/or carbon dioxide gas, thus reducing to a degree the final residual carbon value.

Following the forming of the refractory shape, it is coked. The coking process is performed by heating the brick to an elevated temperature (1000–2500° F.) and, at the same time, preventing access of oxygen to the brick at the elevated temperatures. Exposure of the tar bonded refractory to oxygen at elevated temperatures would allow oxidation of the pitch, thus yielding a product both friable and lower in residual carbon than desired. The temperatures for coking may range from 1000° F. to 2500° F. depending on the time available in which to accomplish the coking operation. The coking operation may be carried out in any of several ways, such as imbedding the ware to be processed in coke or carbonaceous matter, or accomplishing coking in a neutral to reducing atmosphere.

Once the brick are coked, they are impregnated with pitch. The capacity of the coked brick to absorb pitch is appreciable and will vary depending on the degree of coking achieved, since as a result of coking apparent porosities in the range of 10–20% can be developed. The pitch used for impregnation can be of the same type as used in the forming of the pitch bonded brick or it can be of a softening point which is either higher or lower. Typical pitch softening points generally used in this invention have been in the range of 150° F. to 225° F. The method of impregnating the ware with pitch can vary from that employing the use of a combination of vacuum and pressure to that of merely soaking the coked brick in hot pitch. For reasons of speed and thoroughness of impregnation, the vacuum-pressure procedure is preferred. To demonstrate the specific advantages of this invention, the following examples are presented.

Example I

Refractory aggregate of dead-burned magnesite in grain sizings of 4 plus 10 mesh, and minus 65 mesh are combined in the proportions hereinafter indicated and are mixed with a heated liquid pitch binder having a softening point of 180° F. as measured by the ASTM ring and ball test. The dead-burned magnesite of this example has an MgO content of 96% minimum, with the balance of the constituents being oxides of lime, silica, iron and alumina.

EXAMPLE I.—MIXTURE

| Component | Tyler sieve size (mesh) | Percentage |
| --- | --- | --- |
| Dead-burned magnesite (96% MgO) | −3 +10 | 62 |
| Do | −65 | 33 |
| 180° F. softening point pitch | | 5 |
| | | 100 |

It is to be understood that the chemical composition of the dead-burned magnesite and the percentages of the ingredients shown in this example do not constitute a limitation on the invention, since aggregate and pitch quantities of higher or lower percentages and magnesite qualities of various types can be used equally as well to fulfill the intent of the invention. The amount of pitch can be from 3–10% and the aggregate can be from 97–90% by weight of the composition. The size of the aggregate is that conventionally used in brick making but preferred is 55–70% −3 +65 mesh and 25–40% −65 mesh particles.

After having formed tar-bonded refractory shapes of various types from the foregoing mixture using conventional methods previously described, they are then coked at 1200° F. for a period of at least three hours, with the prevention of oxygen access to the brick, following which the coked brick are impregnated with pitch of the same type used for the original forming of the brick, that is, 180° F. softening point pitch. The impregnation is carried out in a pressure vessel under both vacuum and pressure. In this process the brick are placed into the pressure chamber, following which it is evacuated to 28″ to mercury for a period of two minutes minimum. Following this, the pitch is introduced into the chamber and the chamber is placed under 100 p.s.i. pressure for a period of fifteen minutes. It should be realized in considering these figures in this example, that deviations from them can be used without departing from the spirit of this invention.

The following table illustrates the typical properties of brick made by this process. It will be noted in the table that properties are given for brick prior to coking, after coking and after coking and tar impregnation.

| Property | As made brick | Coked brick | Coked-tar impregnated brick |
| --- | --- | --- | --- |
| Density, lb./ft.³ | 180–185 | 175–180 | 183–188 |
| Modulus of rupture, p.s.i. | 1,100–1,400 | 1,200–2,000 | 2,500–4,000 |
| Apparent porosity, percent | 3–6 | 12–15 | Nil |
| Residual carbon, percent [1] | 2.3 | 2.3 | 4.6 |

[1] Theoretical values calculated on the basis of available carbon from pitch based on Conradson coking values of pitch product used. Actual test procedures can produce values slightly less than those indicated, but the increased residual carbon value of the coked, impregnated product increases in the same proportionate order.

The coke bonded brick are impregnated with from 3% to 10% pitch to produce the coke bonded tar impregnated brick of this invention. The final product after coking has a residual carbon content of 4 to 7%. The coked brick prior to impregnation has a residual carbon content of 2 to 4%.

Example II

Refractory aggregates of dead-burned magnesite of about 75% MgO content are used to make brick by the methods of this invention. The brick are made first as a conventionally tar bonded product, using the same mixture of aggregate sizes and pitch content as in Example I, followed by coking, and finally tar impregnation as described in Example I, and the brick properties are described below in the same manner as was given in Example I.

| Property | As made brick | Coked brick | Coked-tar impregnated brick |
| --- | --- | --- | --- |
| Density, lb./ft.³ | 180–185 | 175–180 | 180–185 |
| Modulus of rupture, p.s.i. | 1,100–1,300 | 1,200–2,000 | 2,500–3,500 |
| Apparent porosity, percent | 3–5 | 10–14 | Nil |
| Residual carbon value, percent [1] | 2.3 | 2.3 | 4.6 |

[1] Theoretical values calculated on the basis of available carbon from pitch based on Conradson coking values of pitch product used. Actual test procedures can produce values slightly less than those indicated, but the increased residual carbon value of the coked, impregnated product increases in the same proportionate order.

Since a coke or carbon bond is achieved by the methods of this invention, the brick so made are characterized by the absence of a thermoplastic state during the heating-up phase of placing them in service in the oxygen converters. A thermoplastic state is typical of conventionally tar bonded basis refractories, since the green pitch binder is always heated through its softening point range during the burning in period. With the product of this invention, a thermoplastic softening is prevented due to the fact that the impregnated product has a preformed coke or carbon bond which does not soften.

In the present product the basic refractory aggregates are about 55% to about 70% −3 +65 mesh particles, about 25% to about 40% −65 mesh particles and about 3 to about 10% tar binder. When this product is coked and impregnated with about 3% to about 10% tar, the final product has a density of about 180 to about 192 lb./ft.³, a modulus of rupture of about 2000 to about 4000 p.s.i., substantially no apparent porosity and a residual carbon value of about 4% to about 7%.

Thus it is seen that the present invention provides a coke, tar-impregnated basic refractory in which the brick is first made as a conventionally tar bonded refractory using the normal refractory aggregates of dead-burned magnesite, dead-burned dolomite, dead-burned lime, or combinations of them. The conventionally made tar bonded refractory is then coked by suitable means to effectively form a coke or carbon bond in the brick. This, at the same time, produces apparent porosities in the range of 10–20%. Following coking the brick are then impregnated with pitch by any of several methods but preferably using a vacuum-pressure process. The coked, impregnated brick are characterized by: (a) high residual carbon contents, (b) improved density, (c) improved strength, (d) improved resistance to peeling through elimination of a thermoplastic state, (e) greater ease of burning in inservice, and (f) greater resistance to wetting and erosion by slags and metal.

This invention is intended to cover all changes and modifications of the examples of the invention herein chosen for purposes of the disclosure, which do not constitute departures from the spirit and scope of the invention.

What is claimed is:

1. A coke bonded refractory product having tar impregnated therein consisting essentially of:
 (a) a matrix of brick sized basic refractory particles formed of 55 to 70% −3 +65 mesh particles and 25 to 40% of −65 mesh particles bonded together by coke formed from about 3% to about 10% tar, and
(b) about 3% to about 10% tar impregnated into the interstices of the matrix,
(c) said refractory product having a density of 180 to 192 lb./ft.$^3$, a modulus of rupture of 2000–4000 p.s.i., substantially no apparent porosity and a residual carbon value of 4% to 7%.

2. The product of claim 1 wherein the basic refractory aggregates are selected from the group consisting of dead-burned magnesite, dead-burned dolomite, dead-burned lime, and combinations thereof.

References Cited

UNITED STATES PATENTS

| | | | |
|---|---|---|---|
| 3,015,850 | 1/1962 | Rusoff et al. | 106—56 |
| 3,141,784 | 7/1964 | King et al. | 106—58 |

JAMES E. POER, *Primary Examiner.*

U.S. Cl. X.R.

106—56, 63; 264—29